United States Patent
Takahashi et al.

(10) Patent No.: US 9,895,985 B2
(45) Date of Patent: Feb. 20, 2018

(54) CHARGING INLET LID STRUCTURE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Akira Takahashi, Toyokawa (JP); Yusuke Katagiri, Toyohashi (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-shi (JP)

(*) Notice: Subject to any disclaimer, the term of this patent is extended or adjusted under 35 U.S.C. 154(b) by 164 days.

(21) Appl. No.: 14/945,154

(22) Filed: Nov. 18, 2015

(65) Prior Publication Data
US 2016/0137081 A1 May 19, 2016

(30) Foreign Application Priority Data
Nov. 19, 2014 (JP) .................. 2014-235047

(51) Int. Cl.
H02J 7/00 (2006.01)
B60L 11/18 (2006.01)

(52) U.S. Cl.
CPC ....... B60L 11/1816 (2013.01); *Y02T 10/7005* (2013.01)

(58) Field of Classification Search
USPC .................................. 320/109, 107
See application file for complete search history.

(56) References Cited

U.S. PATENT DOCUMENTS

2010/0270860 A1 10/2010 Kamaga
2013/0152474 A1* 6/2013 Yamamaru .......... B60L 11/1818
49/246
(Continued)

FOREIGN PATENT DOCUMENTS

CN 101764270 A 6/2010
CN 101909926 A 12/2010
(Continued)

OTHER PUBLICATIONS

Office Action issued in the corresponding Chinese Patent Application No. 201510796769.3, dated Sep. 29, 2017 with an English translation thereof.

*Primary Examiner* — Brian Ngo
(74) *Attorney, Agent, or Firm* — Birch, Stewart, Kolasch & Birch, LLP

(57) ABSTRACT

A charging inlet lid structure of a vehicle includes a normal charging inlet and a quick charging inlet in a recess portion for charging, and a first lid and a second lid for the recess portion. One of the normal charging inlet and the quick charging inlet is provided at one side of the recess portion and the other of the normal charging inlet and the quick charging inlet is provided at the other side of the recess portion. The first lid and the second lid are provided so as to slide from totally closed positions where the first lid and the second lid totally close the recess portion in directions in which the first lid and the second lid move away from each other and can be opened and closed independently of each other.

12 Claims, 6 Drawing Sheets

(56) References Cited

U.S. PATENT DOCUMENTS

| | | | | |
|---|---|---|---|---|
| 2013/0153257 A1* | 6/2013 | Yamamaru | .......... | B60L 11/1818 174/67 |
| 2013/0157485 A1* | 6/2013 | Yamamaru | .......... | B60L 11/1818 439/147 |
| 2015/0137755 A1* | 5/2015 | Sadano | ............... | B60L 11/1818 320/109 |
| 2016/0087375 A1* | 3/2016 | Yoshizawa | ............... | B60K 1/04 439/345 |
| 2016/0121746 A1* | 5/2016 | Takahashi | ........... | B60L 11/1818 49/242 |

FOREIGN PATENT DOCUMENTS

| | | |
|---|---|---|
| JP | 2009-171713 A | 7/2009 |
| WO | WO 2014/171035 A1 | 10/2014 |

\* cited by examiner

A-A

B-B

CHARGING INLET LID STRUCTURE

BACKGROUND

The present invention relates to the structure of a charging inlet in which an inlet is provided to which a charging connector is connected and more particularly to the structure of a charging inlet lid which can be opened and closed by the use of a pair of lids.

In recent years, electric vehicles which are driven by electric motors and hybrid electric vehicles which are driven by using an electric motor and an engine in a combined fashion have been developed variously. A battery is provided in an electric vehicle and a hybrid electric vehicle, and an electric motor is driven by means of electric power stored in the battery. Electric power is supplied to the battery installed in the electric vehicle and the hybrid vehicle from a charging facility outside the vehicle (a household power supply (a commercial power supply), a power supply of an exclusive charging facility) to charge the battery. The charging of the battery is executed by connecting a charging connector (a charging gun) to an inlet.

Normally, a charging inlet where an inlet is provided is provided on a side of a vehicle and is designed to be opened and closed by a lid. In general, the lid is attached to the charging inlet at a front side thereof which faces the front of the vehicle so as to swing in a front-to-rear direction of the vehicle (for example, refer to Patent Literature 1).

[Patent Literature 1] JP-A-2009-171713

SUMMARY

In the case of the conventional lid which is attached to the charging inlet so as to swing, with the lid opened, the lid protrudes greatly to the side of the vehicle. Because of this, for example, when a pedestrian passes the side of the vehicle while the battery is being charged, there are fears that the protruding lid interrupts the passage of the pedestrian. Additionally, in case the user fails to close the lid after charging is completed, there are also fears that a pedestrian comes into contact with the lid without noticing that the lid is left opened. In particular, in the case of a charging inlet in which a normal charging inlet and a quick charging inlet are both provided, the area of the charging inlet becomes large relatively. Namely, the area of the lid becomes relatively large, and hence, the lid protrudes greatly to the side of the vehicle, interrupting the passage of the pedestrian much more.

In the charging inlet having the conventional charging inlet structure, the charging inlet is exposed greatly with the lid opened. Because of this, the charging inlet and the charging connector get dirt easily when charging is carried out in rain or snow, and further, there are fears that the charging inlet and the charging connector freeze problematically. For example, in the event of a household power supply being used to charge normally the vehicle, there may be a situation in which with the charging connector connected to the normal charging inlet (a charging situation), the charging connector is left as it is for several hours, easily causing the problem of getting dirt or frozen.

The invention has been made in view of these situations, and an object of the invention is to provide a charging inlet structure which can suppress the protruding amount of a lid which opens to expose a charging inlet and which can restrict the intrusion of rain or snow into the charging inlet while charging is being performed.

According to an advantageous aspect of the invention, there is provided a charging inlet lid structure of a vehicle, comprising:

a recess portion for charging;

a normal charging inlet which is provided in the recess portion and to which a normal charging connector is connected;

a quick charging inlet which is provided adjacent to the normal charging inlet within the recess portion and to which a quick charging connector is connected;

a first lid which opens and closes one side of the recess portion; and a second lid which opens and closes the other side of the recess portion, wherein one of the normal charging inlet and the quick charging inlet is provided at the one side of the recess portion and the other of the normal charging inlet and the quick charging inlet is provided at the other side of the recess portion, and the first lid and the second lid are provided so as to slide from totally closed positions where the first lid and the second lid totally close the recess portion in directions in which the first lid and the second lid move away from each other and can be opened and closed independently of each other.

One of the first lid and the second lid may be provided so as to slide into an inner side of a vehicle body.

The charging inlet lid structure may be configured such that:

the normal charging inlet and the quick charging inlet are arranged in a front-to-rear direction of the vehicle, the one of the first lid and the second lid is disposed forwards in the front-to-rear direction of the vehicle, the other of the first lid and the second lid which is disposed rearwards in the front-to-rear direction is provided so as to slide to an outer side of the vehicle body, and a posture of the other of the first lid and the second lid is inclined relative to a surface of the vehicle body so that a space defined between the surface and the other of the lids becomes wider towards the rear in the front-to-rear direction in a state that the other of the lids caused to slide to the outer side of the vehicle body.

The charging inlet lid structure may be configured such that:

a plurality of guide rails which guide the first lid and the second lid are provided in an interior of the recess portion, each of the first lid and the second lid includes a first arm and a second arm which are disposed at an interval in a sliding direction of each of the first lid and the second lid and which can move along the corresponding guide rail, and each of the guide rails includes a first groove portion with which the first arm is brought into engagement and a second groove portion with which the second arm is brought into engagement, the first groove portion and the second groove portion being formed so as to face in opposite directions.

The charging inlet lid structure may be configured such that:

a lock mechanism which restricts the sliding of the first lid and the second lid, wherein the first lid includes a first flange portion which projects towards the second lid and which is formed with a first through hole formed at a distal end portion thereof, the second lid includes a second flange portion which projects towards the first lid and which is formed with a second through hole at a distal end portion thereof, the first lid flange portion and the second flange portion overlap each other so that the first through hole and the second through hole communicate with each other when the first lid and the second lid are both in their totally closed positions, and the lock mechanism includes a locking pin which can be inserted into the first through hole and the second through hole when the first lid and the second lid are both in their totally closed positions.

DETAILED DESCRIPTION OF EXEMPLIFIED EMBODIMENTS

Figure 1:
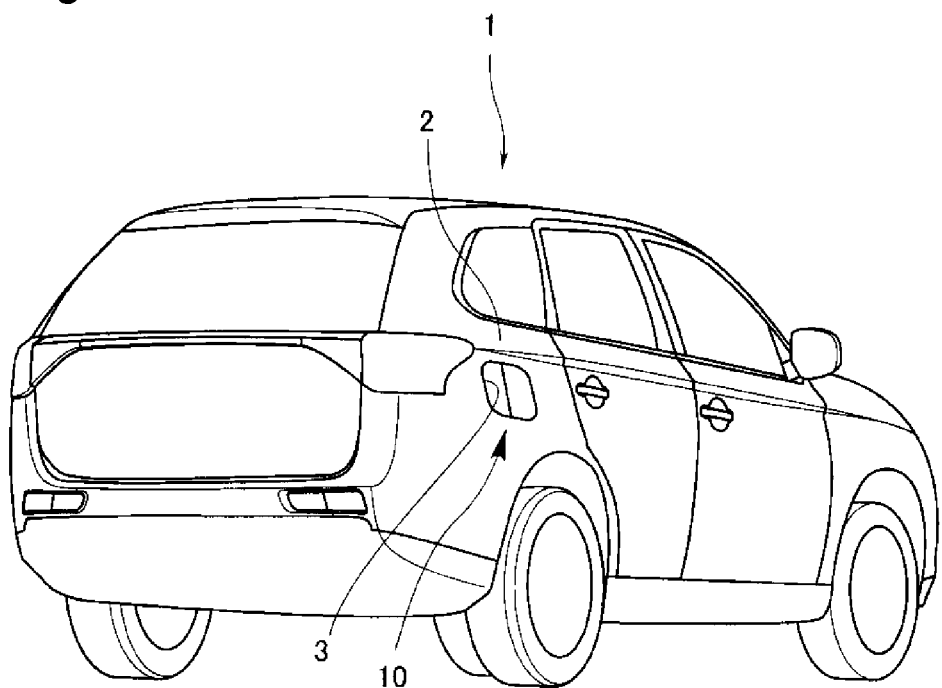
FIG. 1 shows an external view of an example of a vehicle which includes a charging inlet structure according to an embodiment of the invention.

Hereinafter, referring to the drawings, an embodiment of the invention will be described in detail.

Figure 2:
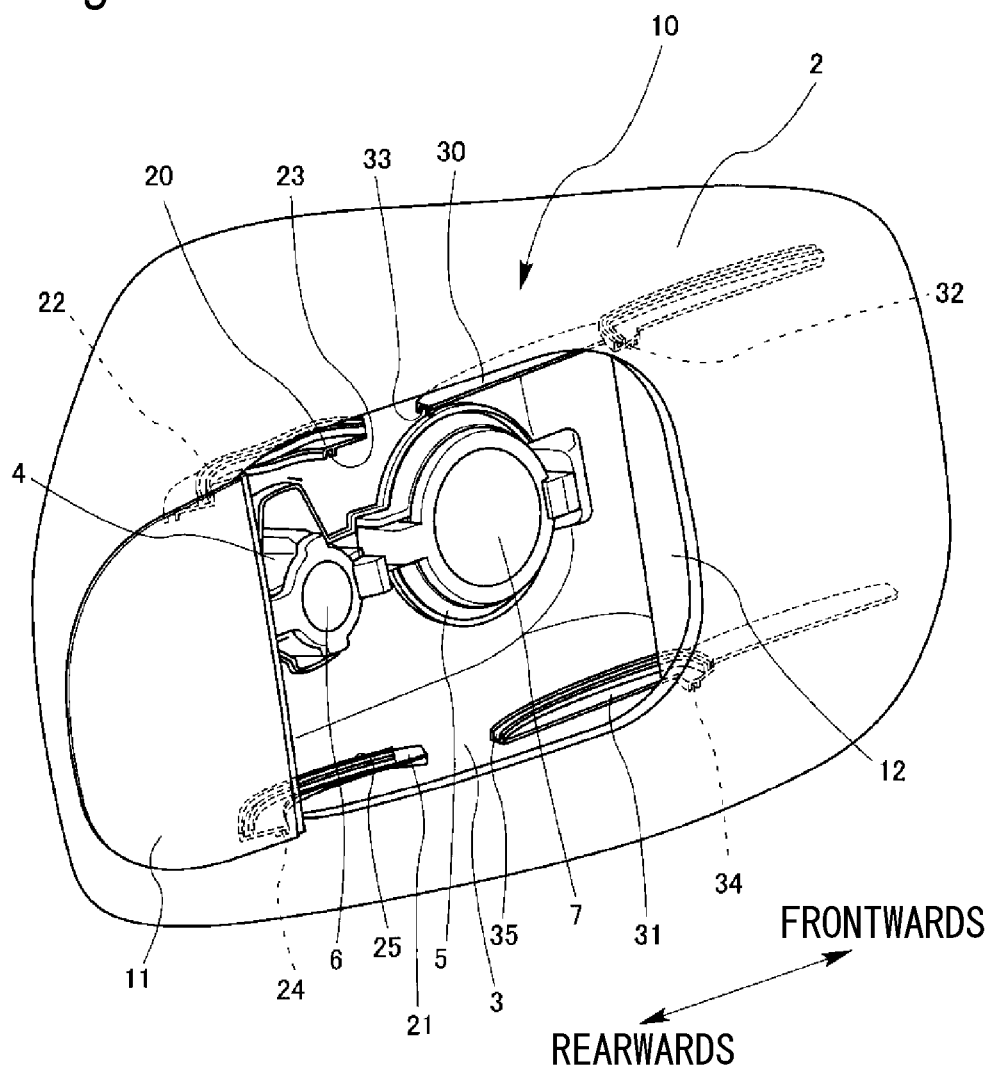
FIG. 2 is a schematic view showing the charging inlet structure according to the embodiment of the invention.
Figure 3:
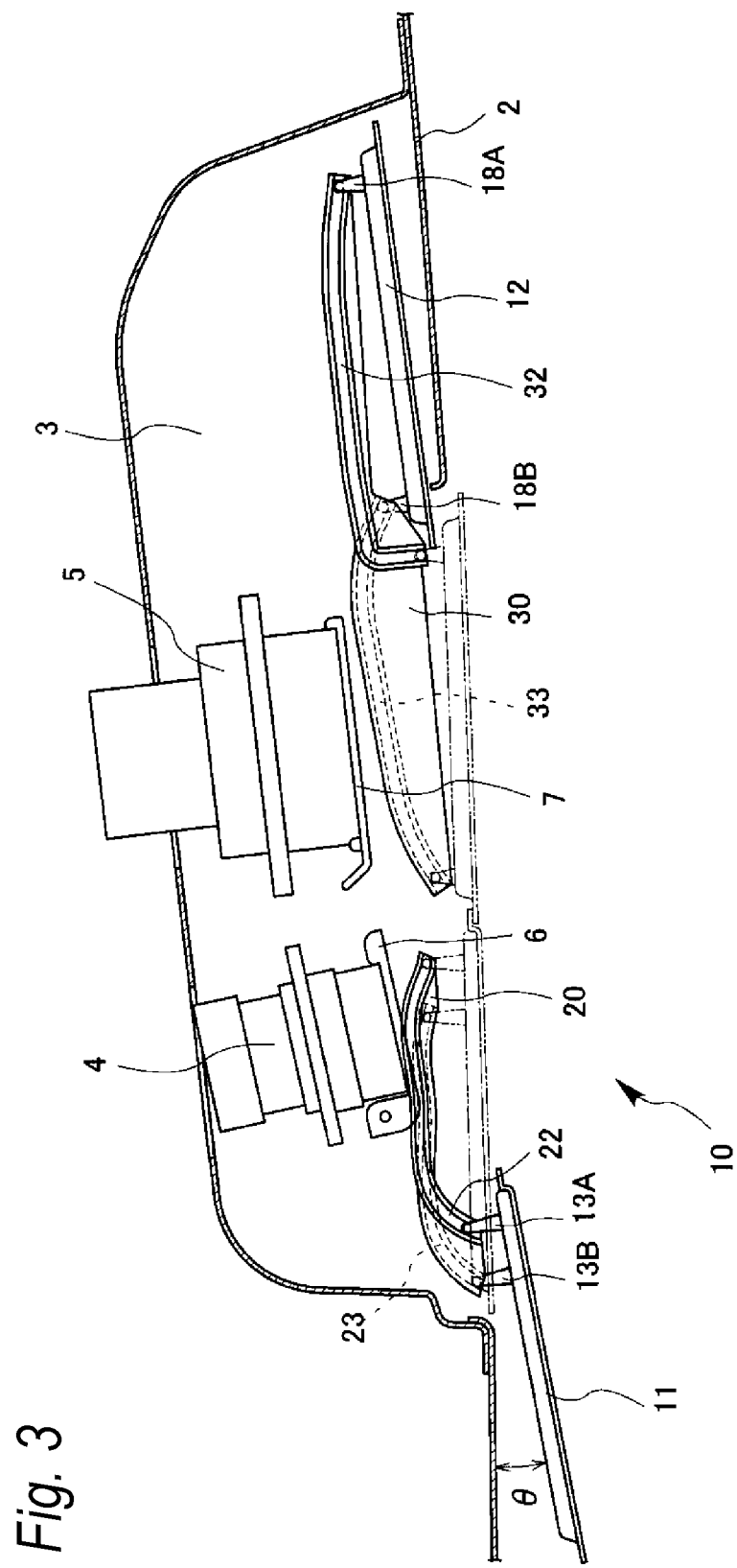
FIG. 3 is a schematic view showing the charging inlet structure according to the embodiment of the invention.
Figure 4A:
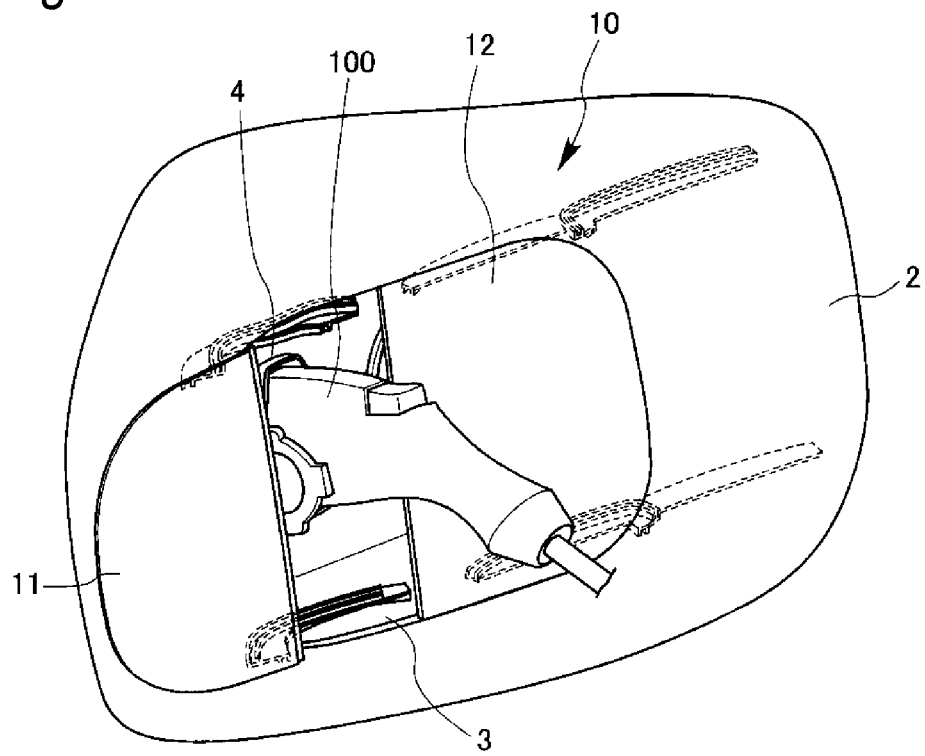
FIGS. 4A and 4B are views of the charging inlet structure according to the embodiment of the invention which show how the charging inlet structure is used.
Figure 4B:
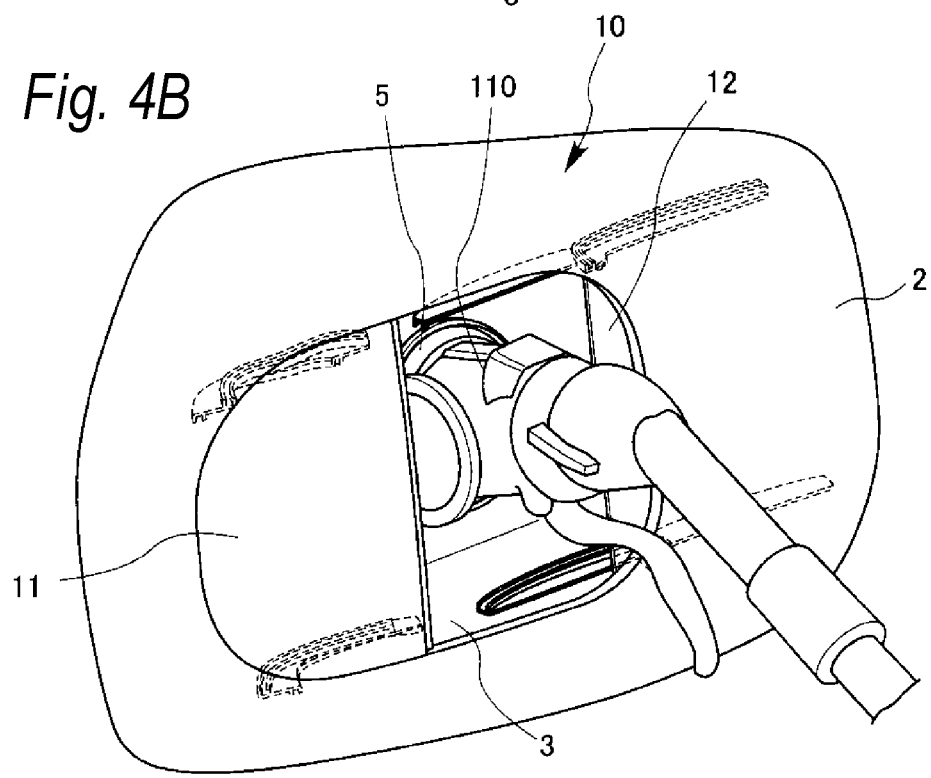
Figure 5A:
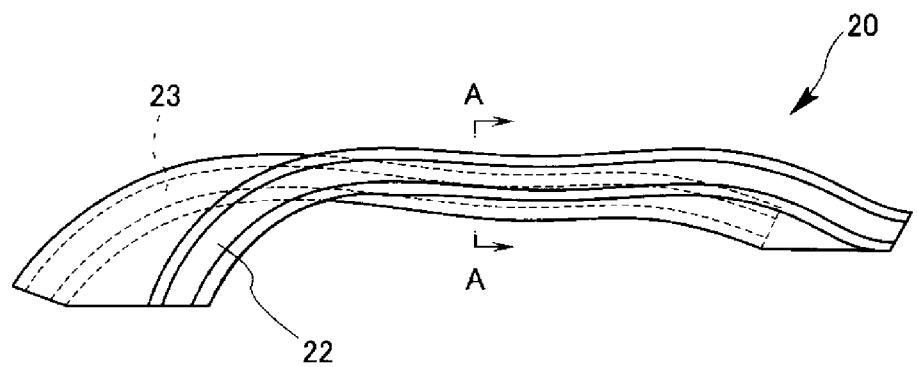
FIGS. 5A and 5B are a top plan view and a front view, respectively, which show an example of a guide rail.
Figure 5B:
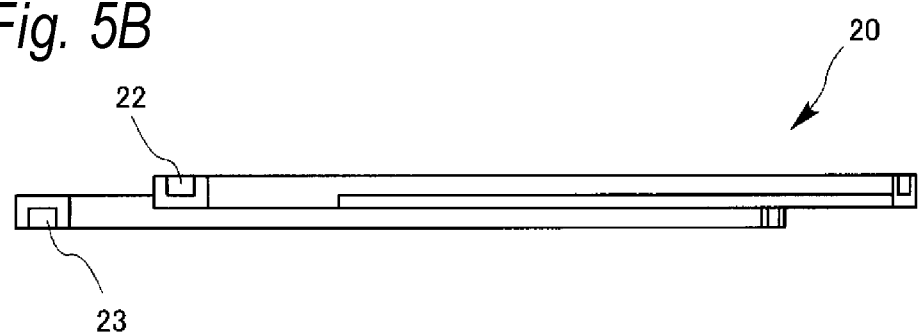
Figure 6:
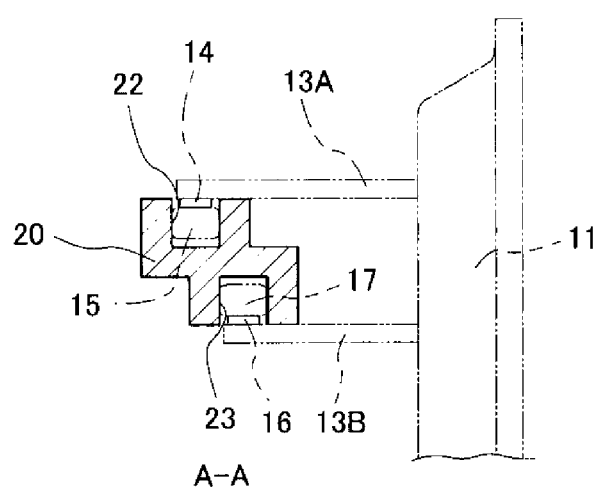
FIG. 6 is a sectional view showing the example of the guide rail.

FIG. 1 is an external view showing an example of a vehicle which includes a charging inlet structure according to the embodiment. FIG. 2 is a schematic view showing the charging inlet structure according to the embodiment, and in FIG. 2, lids are shown as staying in their totally opened positions. FIG. 3 is a schematic view showing the charging inlet structure according to the embodiment, and in FIG. 3, the lids are shown as staying in their totally opened positions. FIGS. 4A and 4B are views showing states in which charging connectors are connected to corresponding inlets. FIGS. 5A and 5B are a top plan view and a front view, respectively, which show an example of a guide rail, and FIG. 6 is a sectional view taken along a line A-A in FIG. 5.

A vehicle 1 according to the embodiment is an electric vehicle which includes a drive motor which is driven by electric power of a battery (a storage device), and as shown in FIG. 1, a charging inlet 3 which is a recess portion is formed in an outer panel 2 of the vehicle 1. Although where to provide the charging inlet 3 is not limited particularly, in this embodiment, the charging inlet 3 is provided on a rear side portion of a vehicle body of the vehicle 1. As shown in FIGS. 2 and 3, a normal charging inlet 4 and a quick charging inlet 5 are provided in parallel in the charging inlet 3. For example, in this embodiment, the quick charging inlet 5 is provided at a front side of the charging inlet 3 which faces the front of the vehicle and the normal charging inlet 4 is provided at a rear side of the charging inlet 3 which faces the rear of the vehicle.

A normal charging connector (a charging connector) which is connected to a household power supply (a plug socket) is connected to the normal charging inlet 4, and a quick charging connector (a charging connector) of quick charging equipment which is placed in a parking area of a commercial facility is connected to the quick charging inlet 5. Then, the battery installed in the vehicle 1 is charged by means of electric power supplied from the normal charging connector or the quick charging connector.

When not in use, the normal charging inlet 4 is closed by a cap 6, whereas when charging is performed, the cap 6 is removed, and the normal charging connector is connected to the normal charging inlet 4. Similarly, the quick charging inlet 5 is also closed by a cap 7 when not in use.

A lid apparatus 10 is provided at the charging inlet 3, so that the charging inlet 3 can be opened and closed by this lid apparatus 10. The lid apparatus 10 has a rear lid (a first lid) 11 which is disposed at the rear side of the vehicle of the charging inlet 3 so as to be opened and closed and a front lid (a second lid) 12 which is disposed at the front side of the vehicle of the charging inlet 3 so as to be opened and closed. As described above, the normal charging inlet 4 is provided at the rear side of the vehicle of the charging inlet 3, and the quick charging inlet 5 is provided at the front side of the vehicle of the charging inlet 3. Then, the rear lid 11 is provided to have a size which is large enough to cover an area which corresponds to the normal charging inlet 4 of the charging inlet 3, and the front lid 12 is provided to have a size which is large enough to cover an area which corresponds to the quick charging inlet 5 of the charging inlet 3. An outside diameter of the normal charging inlet 4 is smaller than that of the quick charging inlet 5. Because of this, the rear lid 11 is formed smaller than the front lid 12.

There is imposed no particular limitation on where to dispose the normal charging inlet 4 and the quick charging inlet 5, and hence, the normal charging inlet 4 may be provided at the front side of the vehicle of the charging inlet 3. As this occurs, the rear lid 11 is formed to a size which is wide enough to cover the area which corresponds to the quick charging inlet 5 of the charging inlet 3, while the front lid 12 is formed to a size which is wide enough to cover the area which corresponds to the normal charging inlet 4 of the charging inlet 3.

The rear lid 11 and the front lid 12 which make up the lid apparatus 10 described above are configured so as to slide in a front-to-rear direction of the vehicle 1 by hand to thereby open the charging inlet 3 towards the rear and front of the vehicle 1, respectively. As shown in FIG. 3, the rear lid 11 can slide from a totally closed position (indicated by phantom lines in the figure) to a totally opened position (indicated by solid lines in the figure) which lies further rearwards towards the rear of the vehicle 1 than the totally closed position, and the rear lid 11 is situated on an outer side of the vehicle 1 when it is located in the totally opened position. On the other hand, the front lid 12 can slide from a totally closed position towards the front of the vehicle, and the front lid 12 is situated on an inner side of the vehicle 1 when it is located in the totally opened position. Namely, the rear lid 11 and the front lid 12 are both allowed to slide from their totally closed positions where the rear lid 11 and the front lid 12 cover the charging inlet 3 in a direction in which the lids move away from each other along the front-to-rear direction of the vehicle 1.

Further, in the lid apparatus 10, the rear lid 11 and the front lid 12 are allowed to be opened and closed individually in a manual fashion. Specifically, as shown in FIG. 4A, in the lid apparatus 10, only the rear lid 11 can be opened to the fully opened position with the front lid 12 kept closed. In this embodiment, as has been described above, the rear lid 11 is formed to the size which is wide enough to cover the area which corresponds to the normal charging inlet 4 in the charging inlet 3, and therefore, with only the rear lid 11 opened, a normal charging connector 100 can be connected to the normal charging inlet 4.

Additionally, as shown in FIG. 4B, in the lid apparatus 10, only the front lid 12 can be opened to the fully opened position with the rear lid 11 kept closed. In this embodiment, as has been described above, the front lid 12 is formed to the size which is wide enough to cover the area which corresponds to the quick charging inlet 5 in the charging inlet 3, and therefore, with only the front lid 12 opened, a quick charging connector 110 can be connected to the quick charging inlet 5.

In this way, as a result of both the rear lid 11 which covers the area which corresponds to the normal charging inlet 4 and the front lid 12 which covers the area which corresponds to the quick charging inlet 5 being configured to be opened and closed individually, the area where the charging inlet 3 is exposed when charging is being performed can be restricted to a minimum level. Consequently, even when it is raining or snowing while charging is being performed, the intrusion of rain or snow into the charging inlet 3 can be restricted, as a result of which the interior of the charging inlet 3 can be restricted from getting dirty or frozen.

Additionally, the rear lid 11 and the front lid 12 slide in the front-to-rear direction of the vehicle to open the charging inlet 3 to both the sides, and therefore, the rear lid 11 and the front lid 12 are restricted from projecting greatly when they stay in their fully opened positions. This can restrict a pedestrian who passes the side of the vehicle 1 from being brought into contact with the rear lid 11 and the front lid 12, for example, even when the user of the vehicle fails to close the rear lid 11 or the front lid 12 during or after charging.

Additionally, the front lid 12 is made to be situated on the inner side of the vehicle body when the front lid 12 stays in its fully opened position, and therefore, the pedestrian can be restricted from being brought into contact with the rear lid 11 and the front lid 12 in a more ensured fashion. In addition, instead of the front lid 12, the rear lid 11 may be made to be situated on the inner side of the vehicle body when the rear lid 11 stays in its fully opened position. Also in this case, the pedestrian can be restricted from being brought into contact with the rear lid 11 and the front lid 12 in a more ensured fashion.

Further, the rear lid 11 is situated on the outer side of the vehicle body, that is, on the outer side of an outer panel 2 in its fully opened position. However, a space defined between the rear lid 11 and a surface of the vehicle body is made to get wider towards the rear of the vehicle in such a state that the rear lid 11 is slid to the outer side of the vehicle body, that is, in the fully opened position. Namely, when in the fully opened position, the rear lid 11 is held in a state (a posture) in which the rear lid 11 is inclined at a predetermined angle θ with respect to the surface of the vehicle body so that a surface of the rear lid 11 is oriented to the front of the vehicle (refer to FIG. 3).

This makes it difficult for a problem to happen in which a pedestrian is caught at an end portion of the rear lid 11 should the rear lid 11 and the pedestrian be brought into contact with each other as a result of the vehicle being driven in such a state that the user of the vehicle fails to close the rear lid 11. Preferably, the end portion of the rear lid 11 at the forward of the vehicle is disposed as a position or near where the end portion is in a plane same as a surface of the vehicle.

There is imposed no specific limitation on the structure in which the rear lid 11 and the front lid 12 slide in the front-to-rear direction of the vehicle 1 in the way described above. However, in this embodiment, the rear lid 11 and the front lid 12 are supported by guide rails which are provided in an interior of the charging inlet 3 so that the rear lid 11 and the front lid 12 can be caused to slide along the guide rails manually.

To describe this in detail, as shown in FIG. 2, a rear upper guide rail 20 and a front upper guide rail 30 are provided at an upper side of the charging inlet 3, and a rear lower guide rail 21 and a front lower guide rail 31 are provided at a lower side of the charging inlet 3.

Then, the rear lid 11 is guided to be opened and closed by the rear upper guide rail 20 and the rear lower guide rail 21, and the front lid 12 is guided to be opened and closed by the front upper guiderail 30 and the front lower guide rail 31. These guide rails are all constructed in the same way, and therefore, in the following description, the structure of the guide rails will be described by taking the rear upper guide rail 20 for example.

As shown in FIGS. 5A to 6, a first guide groove (a first groove portion) 22 which is opened upwards and a second guide groove (a second groove portion) 23 which is opened downwards are provided in the rear upper guide rail 20. Namely, the first guide groove 22 is provided on an upper surface of the rear upper guide rail 20, and the second guide groove 23 is provided on a lower surface of the rear upper guide rail 20, so that the first guide groove 22 and the second guide groove 23 are oriented (opened) in opposite directions. A pair of upper arms 13 (a first upper arm (a first arm) 13A and a second upper arm (a second arm) 13B) are provided on the rear lid 11 for the rear upper guide rail 20 in such a way as to project inwards of the charging inlet 3 (refer to FIGS. 3, 6). A first engaging portion 14 is provided at a distal end portion of the first upper arm 13A in such a way as to be oriented downwards. This first engaging portion 14 is brought into engagement with the first guide groove 22 so as to move along the first guide groove 22. In this embodiment, a rolling member 15 such as a roller is provided on the first engaging portion 14, whereby the first engaging portion 14 can move in the first guide groove 22 as a result of the rolling member 15 rolling. The rolling member 15 does not necessarily have to be provided, and hence, the first engaging portion 14 may be made to slide within the first guide groove 22.

A second engaging portion 16 is provided at a distal end portion of the second upper arm 13B in such a way as to project upwards. Then, this second engaging portion 16 is brought into engagement with the second guide groove 23 so as to move along the second guide groove 23. In this embodiment, as with the first engaging portion 14, a rolling member 17 such as a roller is provided on the second engaging portion 16.

The first upper arm 13A and the second upper arm 13B are disposed at an interval in the front-to-rear direction of the vehicle 1, that is, in the direction in which the rear lid 11 slides. This enables the rear lid 11 to be guided into a predetermined position with a predetermined posture (inclination) by the first upper arm 13A and the second upper arm 13B when the rear lid 11 is opened and closed. However, since the rear lid 11 moves to the outer side of the vehicle body, both the first upper arm 13A and the second upper arm 13B are provided near a front end portion of the rear lid 11 which faces the front of the vehicle so as not to interfere with the vehicle body in the totally opened positions.

In this configuration, a track (locus) where the rear lid 11 is opened and closed can be set relatively easily. Namely, since the first guide groove 22 is formed on the upper surface of the rear upper guide rail 20 and the second guide groove 23 is provided on the lower surface which is opposite to the side where the first guide groove 22 is provided, the degree of freedom in shaping the first guide groove 22 and the second guide groove 23 can be enhanced. For example, as in this embodiment, the first guide groove 22 can be made to intersect the second guide groove 23 when seen from thereabove (refer to FIG. 5).

The rear upper guide rail 20 is fixed in place with a predetermined space defined between an upper surface of the charging inlet 3 and itself so that the pair of upper arms 13 can be brought into engagement therewith from above and below. There is imposed no specific limitation on the fixing method, however, for example, a configuration may be adopted in which a plurality of projecting portions (not shown) which project downwards from the upper surface of the charging inlet 3, so that the rear upper guide rail 20 is fixed to these projecting portions.

Incidentally, the rear lower guide rail 21 which guides the rear lid 11 to be opened and closed together with the rear upper guide rail 20 has a structure which is one realized by inverting the structure of the rear upper guide rail 20 upside down. Namely, a third guide groove (a first groove portion) 24 having the same configuration as that of the first guide groove 22 is provided on a lower surface of the rear lower guide rail 21, and a fourth guide groove (a second groove portion) 25 having the same configuration as that of the second guide groove 23 is provided on an upper surface of the rear lower guide rail 21 (refer to FIG. 2). Although the illustration is omitted, a pair of lower arms (a first lower arm and a second lower arm), which are realized by inverting the pair of upper arms 13 upside down, are provided on the rear lid 11, so that the first lower arm and the second lower arm can move in the third guide groove 24 and the fourth guide groove 25, respectively.

Further, as with the rear upper guide rail 20, in the front upper guide rail 30, a first guide groove (a first groove portion) 32 which is opened upwards is provided on an upper surface thereof, and a second guide groove (a second guide portion) 33 which is opened downwards is provided on a lower surface thereof (refer to FIG. 2). Additionally, as with the rear lower guide rail 21, in the front lower guide rail 31, a first guide groove 32 having the same configuration as that of the third guide groove 34 is provided on a lower surface thereof, and a fourth guide groove 35 having the same configuration as that of the second guide groove 33 is provided on an upper surface thereof.

A pair of upper arms 18 (a first upper arm 18A and a second upper arm 18B) are provided on the front lid 12 so as to correspond to the front upper guide rail 30 (refer to FIG. 3). Since the front lid 12 is situated on the inner side of the vehicle body when it stays in the totally opened position, there is no such situation that the first upper arm 18A and the second upper arm 18B comes to interfere with the vehicle body when the front lid 12 slides. Because of this, being different from the rear lid 11, the first upper arm 18A and the second upper arm 18B are provided individually near both end portions of the front lid 12 in the front-to-rear direction of the vehicle.

The structure of the pair of upper arms 18 is the same as the structure of the pair of upper arms 13 provided to the rear lid 11, and therefore, the detailed description of the structure of the pair of upper arms 18 will be omitted herein. Although the illustration is omitted, a pair of lower arms (a first lower arm and a second lower arm) which are realized by inverting the pair of upper arms 18 upside down are also provided on the front lid 12 so as to correspond to the front lower guide rail 31.

Figure 7:
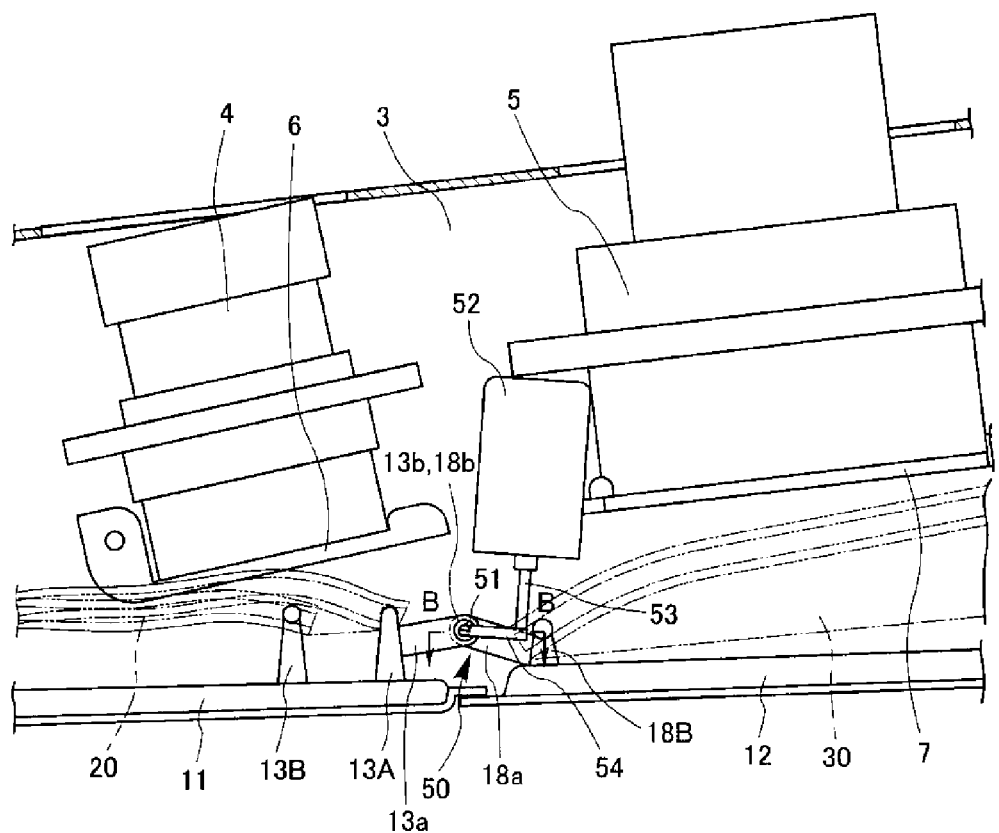
FIG. 7 is a view showing a modified example of a charging inlet structure according to the embodiment of the invention.

Incidentally, the lid apparatus 10 may include a locking mechanism portion 50 which restricts the slide of the rear lid 11 and the front lid 12 in such a state that the rear lid 11 and the front lid 12 are caused to slide manually to close the charging inlet 3. FIG. 7 is a view showing a state in which the rear lid and the front lid are locked by the locking mechanism portion, and FIG. 8 is a sectional view taken along a line B-B in FIG. 7 which explains the operation of a locking pin which makes up the locking mechanism portion.

Figure 8:
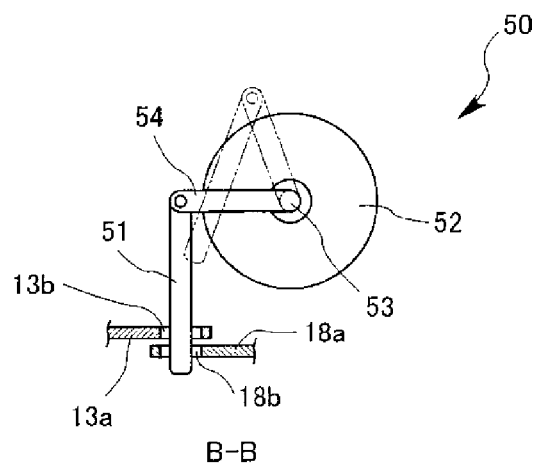
FIG. 8 is a view showing a lock mechanism portion according to the embodiment of the invention.

As shown in FIGS. 7 and 8, a rear flange portion 13a (a first flange portion) is provided on the first upper arm 13A of the rear lid 11 so as to project towards the front lid 12, and a first through hole 13b is provided in a front end portion thereof so as to penetrate in an up-to-down direction. On the other hand, a front flange portion 18a (a second flange portion) is provided on the first upper arm 18A of the front lid 12 so as to project towards the rear lid 11, and a second through hole 18b is formed in a front and portion thereof. The rear flange portion 13a and the front flange portion 18a are provided in different positions in relation to the up-to-down direction. The rear flange portion 13a and the front flange portion 18a overlap each other partially when the rear lid 11 and the front lid 12 stay in their totally closed positions, so that the first through hole 13b and the second through hole 18b communicate with each other.

The locking mechanism portion 50 has the locking pin 51 which is inserted into the first through hole 13b and the second through hole 18b which communicate with each other in the way described above and an actuator device (a drive device) 52 which inserts and removes the locking pin 51 into and from the first through hole 13b and the second through hole 18b. In this embodiment, the actuator 52 is made up of a motor, for example, and the locking pin 51 is connected to a rotational shaft 53 of the motor via a connecting member 54. The connecting member 54 is fixed to a distal end of the rotational shaft 53, and the locking pin 51 is connected rotatably to a distal end portion of the connecting member 54.

Then, with the rear lid 11 and the front lid 12 kept opened, the locking pin 51 is situated above the rear flange portion 13a and the front flange portion 18a as indicated by phantom lines in FIG. 8. From this state, the rear lid 11 and the front lid 12 are moved to their totally closed positions, and the actuator 52 is driven to rotate in a predetermined direction (rotate leftwards in FIG. 8). This causes the locking pin 51 to be inserted into the first through hole 13b and the second through hole 18b, whereby the rear lid 11 and the front lid 12 are put into a locked state. With the rear lid 11 and the front lid 12 locked, the actuator 52 is driven to rotate in an opposite direction to the direction in which the actuator 52 is rotated for locking (rotate clockwise in FIG. 8), whereby the locking pin 51 is removed from the first through hole 13b and the second through hole 18b, unlocking the rear lid 11 and the front lid 12.

By providing the locking mechanism portion 50 configured in the way described above, the locking and unlocking of the rear lid 11 and the front lid 12 can be executed relatively easily and in an ensured fashion.

According to the charging inlet structure of the invention, the area where the charging inlet is exposed when charging is being performed can be restricted to the minimum area. Consequently, for example, even when it is raining or snowing while charging is being performed, the intrusion of rain or snow into the charging inlet 3 can be restricted, as a result of which the interior of the charging inlet 3 can be restricted from getting dirty or frozen. Also, as the protruding amount of the rear lid and the front lid in the totally opened position is suppressed, it can be restricted that a pedestrian who passes the side of the vehicle is brought into contact with the rear lid 11 and the front lid 12.

Thus, while the embodiment of the invention has been described, the invention is, of course, not limited to the embodiment that has been described above.

For example, in the embodiment, the rear lid (the first lid) and the front lid (the second lid) are described as being provided so as to slide in the front-to-rear direction of the vehicle. However, the first lid and the second lid may be provided so as to slide in the up-to-down direction of the vehicle. Namely, there is imposed no specific limitation to the disposition of the first lid and the second lid, as long as the first lid and the second lid are provided so as not only to slide from their totally closed positions where they cover the charging inlet in the directions in which they move away from each other but also to be opened and closed individually.

What is claimed is:

1. A charging inlet lid structure of a vehicle, comprising:
a recess portion for charging;
a normal charging inlet which is provided in the recess portion and to which a normal charging connector is connected;
a quick charging inlet which is provided adjacent to the normal charging inlet within the recess portion and to which a quick charging connector is connected;
a first lid which opens and closes one side of the recess portion; and
a second lid which opens and closes the other side of the recess portion, wherein
one of the normal charging inlet and the quick charging inlet is provided at the one side of the recess portion, such that the first lid covers only the one of the normal charging inlet and the quick charging inlet when closed, and the other of the normal charging inlet and the quick charging inlet is provided at the other side of the recess portion, such that the second lid covers only the other of the normal charging inlet and the quick charging inlet when closed, and
the first lid and the second lid are provided so as to slide, from totally closed positions where the first lid and the second lid totally close the recess portion, in directions in which the first lid and the second lid move away from each other and can be opened and closed independently of each other.

2. The charging inlet lid structure according to claim 1, wherein
one of the first lid and the second lid is provided so as to slide into an inner side of a vehicle body.

3. The charging inlet lid structure according to claim 2, wherein
the normal charging inlet and the quick charging inlet are arranged in a front-to-rear direction of the vehicle,
the one of the first lid and the second lid is disposed forwards in the front-to-rear direction of the vehicle,
the other of the first lid and the second lid which is disposed rearwards in the front-to-rear direction is provided so as to slide to an outer side of the vehicle body, and
a posture of the other of the first lid and the second lid is inclined relative to a surface of the vehicle body so that a space defined between the surface and the other of the lids becomes wider towards the rear in the front-to-rear direction in a state that the other of the lids caused to slide to the outer side of the vehicle body.

4. The charging inlet lid structure according to claim 2, wherein
a plurality of guide rails which guide the first lid and the second lid are provided in an interior of the recess portion,
each of the first lid and the second lid includes a first arm and a second arm which are disposed at an interval in a sliding direction of each of the first lid and the second lid and which can move along the corresponding guide rail, and
each of the guide rails includes a first groove portion with which the first arm is brought into engagement and a second groove portion with which the second arm is brought into engagement, the first groove portion and the second groove portion being formed so as to face in opposite directions.

5. The charging inlet lid structure according to claim 3, wherein
a plurality of guide rails which guide the first lid and the second lid are provided in an interior of the recess portion,
each of the first lid and the second lid includes a first arm and a second arm which are disposed at an interval in a sliding direction of each of the first lid and the second lid and which can move along the corresponding guide rail, and
each of the guide rails includes a first groove portion with which the first arm is brought into engagement and a second groove portion with which the second arm is brought into engagement, the first groove portion and the second groove portion being formed so as to face in opposite directions.

6. The charging inlet lid structure according to claim 2, further comprising:
a lock mechanism which restricts the sliding of the first lid and the second lid, wherein
the first lid includes a first flange portion which projects towards the second lid and which is formed with a first through hole formed at a distal end portion thereof,
the second lid includes a second flange portion which projects towards the first lid and which is formed with a second through hole at a distal end portion thereof,
the first lid flange portion and the second flange portion overlap each other so that the first through hole and the second through hole communicate with each other when the first lid and the second lid are both in their totally closed positions, and
the lock mechanism includes a locking pin which can be inserted into the first through hole and the second through hole when the first lid and the second lid are both in their totally closed positions.

7. The charging inlet lid structure according to claim 3, further comprising:
a lock mechanism which restricts the sliding of the first lid and the second lid, wherein
the first lid includes a first flange portion which projects towards the second lid and which is formed with a first through hole formed at a distal end portion thereof,
the second lid includes a second flange portion which projects towards the first lid and which is formed with a second through hole at a distal end portion thereof,
the first lid flange portion and the second flange portion overlap each other so that the first through hole and the second through hole communicate with each other when the first lid and the second lid are both in their totally closed positions, and the lock mechanism includes a locking pin which can be inserted into the first through hole and the second through hole when the first lid and the second lid are both in their totally closed positions.

8. A charging inlet lid structure of a vehicle, comprising:
a recess portion for charging;
a normal charging inlet which is provided in the recess portion and to which a normal charging connector is connected;
a quick charging inlet which is provided adjacent to the normal charging inlet within the recess portion and to which a quick charging connector is connected;
a first lid which opens and closes one side of the recess portion; and
a second lid which opens and closes the other side of the recess portion, wherein
one of the normal charging inlet and the quick charging inlet is provided at the one side of the recess portion and the other of the normal charging inlet and the quick charging inlet is provided at the other side of the recess portion, and
the first lid and the second lid are provided so as to slide from totally closed positions where the first lid and the second lid totally close the recess portion in directions in which the first lid and the second lid move away from each other and can be opened and closed independently of each other, wherein
a plurality of guide rails which guide the first lid and the second lid are provided in an interior of the recess portion,
each of the first lid and the second lid includes a first arm and a second arm which are disposed at an interval in a sliding direction of each of the first lid and the second lid and which can move along the corresponding guide rail, and
each of the guide rails includes a first groove portion with which the first arm is brought into engagement and a second groove portion with which the second arm is brought into engagement, the first groove portion and the second groove portion being formed so as to face in opposite directions.

9. The charging inlet lid structure according to claim 4, further comprising:
a lock mechanism which restricts the sliding of the first lid and the second lid, wherein
the first lid includes a first flange portion which projects towards the second lid and which is formed with a first through hole formed at a distal end portion thereof,
the second lid includes a second flange portion which projects towards the first lid and which is formed with a second through hole at a distal end portion thereof,
the first lid flange portion and the second flange portion overlap each other so that the first through hole and the second through hole communicate with each other when the first lid and the second lid are both in their totally closed positions, and
the lock mechanism includes a locking pin which can be inserted into the first through hole and the second through hole when the first lid and the second lid are both in their totally closed positions.

10. The charging inlet lid structure according to claim 5, further comprising:
a lock mechanism which restricts the sliding of the first lid and the second lid, wherein
the first lid includes a first flange portion which projects towards the second lid and which is formed with a first through hole formed at a distal end portion thereof,
the second lid includes a second flange portion which projects towards the first lid and which is formed with a second through hole at a distal end portion thereof,
the first lid flange portion and the second flange portion overlap each other so that the first through hole and the second through hole communicate with each other when the first lid and the second lid are both in their totally closed positions, and
the lock mechanism includes a locking pin which can be inserted into the first through hole and the second through hole when the first lid and the second lid are both in their totally closed positions.

11. The charging inlet lid structure according to claim 8, further comprising:
a lock mechanism which restricts the sliding of the first lid and the second lid, wherein
the first lid includes a first flange portion which projects towards the second lid and which is formed with a first through hole formed at a distal end portion thereof,
the second lid includes a second flange portion which projects towards the first lid and which is formed with a second through hole at a distal end portion thereof,
the first lid flange portion and the second flange portion overlap each other so that the first through hole and the second through hole communicate with each other when the first lid and the second lid are both in their totally closed positions, and
the lock mechanism includes a locking pin which can be inserted into the first through hole and the second through hole when the first lid and the second lid are both in their totally closed positions.

12. A charging inlet lid structure of a vehicle, comprising:
a recess portion for charging;
a normal charging inlet which is provided in the recess portion and to which a normal charging connector is connected;
a quick charging inlet which is provided adjacent to the normal charging inlet within the recess portion and to which a quick charging connector is connected;
a first lid which opens and closes one side of the recess portion; and
a second lid which opens and closes the other side of the recess portion, wherein
one of the normal charging inlet and the quick charging inlet is provided at the one side of the recess portion and the other of the normal charging inlet and the quick charging inlet is provided at the other side of the recess portion, and
the first lid and the second lid are provided so as to slide from totally closed positions where the first lid and the second lid totally close the recess portion in directions in which the first lid and the second lid move away from each other and can be opened and closed independently of each other,
the charging inlet stricture, further comprising:
a lock mechanism which restricts the sliding of the first lid and the second lid, wherein
the first lid includes a first flange portion which projects towards the second lid and which is formed with a first through hole formed at a distal end portion thereof,
the second lid includes a second flange portion which projects towards the first lid and which is formed with a second through hole at a distal end portion thereof,
the first lid flange portion and the second flange portion overlap each other so that the first through hole and the second through hole communicate with each other when the first lid and the second lid are both in their totally closed positions, and the lock mechanism includes a locking pin which can be inserted into the first through hole and the second through hole when the first lid and the second lid are both in their totally closed positions.

\* \* \* \* \*